United States Patent Office 2,739,081
Patented Mar. 20, 1956

2,739,081

PROCESS OF COATING A RESIN IMPREGNATED SUPPORT SHEET WITH A MELAMINE-FORMALDEHYDE COMPOSITION AND RESULTING PRODUCT

Henry P. Wohnsiedler, Darien, and Walter M. Thomas, Springdale, Conn., assignors to American Cyanamid Company, New York, N. Y., a corporation of Maine No Drawing. Application March 28, 1952,
Serial No. 279,224

6 Claims. (Cl. 117—73)

This invention relates to a process for producing surface laminates and, more particularly, this invention relates to surface laminates prepared by coating a support sheet, impregnated with a thermosetting resin, with a paste-like suspension of a plasticized, insolubilized melamine-formaldehyde resin in an aqueous alcohol dispersion medium. The coated sheet is dried and thereafter heat and pressure is applied thereto to produce the finished product. Still further, this invention relates to the surface laminates produced in accordance with the process of the present invention.

One of the objects of the present invention is to produce a surface laminate having all of the desirable characteristics of melamine resin laminate generally. A further object of the present invention is to produce a surface laminate having unusual surface appearance and properties in which depth of color and excellent durability is combined with improved alcohol resistance and resistance to staining. A further object of the present invention is to produce a surface laminate by coating an impregnated support sheet with a plasticized, insolubilized melamine-formaldehyde resin paste, thereafter drying and subjecting the assembly to heat and pressure. These and other objects of the present invention will be discussed more fully hereinbelow.

This application is a continuation-in-part of our earlier filed U. S. patent application, Serial No. 684,783 filed July 19, 1946, now abandoned, for Surfacing Resins and Products Obtained Therefrom.

The melamine resins are particularly well adapted for surfacing laminates or other structures built up from phenolic or amino resin impregnated paper or fibrous material, compressed wood, "Masonite" or other cheap core materials by virtue of their thermosetting characteristic and heat resistance as well as their chemical resistance, hardness and light, durable colors. These surface laminates generally are used for making table tops and in this use unmodified melamine resins display excellent heat resistance, resistance to alcohol and other properties. However, the reinforcing fibrous matter, particularly the cellulose sheet which is used in the conventional laminate detracts from mar and stain resistance and limits color effects which can be obtained. By the process of the present invention, unusual color effects are made possible and the other properties desired in a laminate surface are obtained. By modifying melamine resins with certain plasticizers not treated in accordance with the present invention, one finds that the attack on the surface by alcohol is exceedingly severe. Consequently, when an improvement has been made in one respect, namely an improvement in mar resistance, a deterioration in alcohol resistance is experienced. We have found that we can prepare a resinous composition comprising a melamine-formaldehyde resin and a plasticizer which can be utilized to prepare these surface laminates which have the alcohol resistance of the unmodified melamine resin laminates while displaying the improved mar resistance and durability of the plasticized melamine-formaldehyde resin composition laminates. Generally speaking, this is accomplished by blending a plasticizer such as an alcohol soluble linear polyamide, polyvinyl formal, polyvinyl acetal or polyvinyl butyral on heated differential rolls wherein the melamine resin is a water soluble resin at the outset but is rendered insolubilized by the heat treatment received during the blending operation on the heated differential rolls. Thereafter, this plasticized melamine-formaldehyde resin in an insolubilized state must be dispersed in a suitable medium in order that it can be utilized in preparing surface laminates. This dispersing step is accomplished by milling the plasticized insolubilized resin in some conventional milling machine such as a ball mill in the presence of the medium, namely an alcohol aqueous solution. The milling step is continued until the plasticized resin is dispersed in the medium to a paste-like consistency. The composition is then ready for use.

In preparing a surface laminate, one applies the plasticized, insolubilized melamine-formaldehyde composition briefly described hereinabove by coating the same on a support sheet which has been previously impregnated with a thermosetting resin and the support sheet thus coated is heated for a period of time sufficient to render the coated sheet dry. Thereafter, the coated sheet is subjected to heat and pressure to produce the surface laminate having improved mar resistance and improved alcohol resistance.

In the prior art efforts have been made to improve the durability of surface laminates by incorporating a fabric or fibrous material in the surface layer in order to obtain the necessary strength to resist stresses set up in a cured coating upon a substrata having different thermal expansion and porosity properties.

The purpose of the present case is to produce a distinct surface layer of cured resin having sufficient strength of its own without benefit of any reinforcing fiber incorporated therein. The surface resin layers of the present invention exists as an intimate and integral part of the main structure although they do form a distinct layer as microscopic cross-sectioning clearly demonstrates. The prior art processes have made use of the fusible, soluble resins because these resins provide a convenient means of combining resin with paper. In polymerizing these resins in situ the stresses and strains referred to hereinabove often caused defects to be produced in the final laminate.

In order that the present invention may be more completely understood, the following examples are set forth in which all parts are parts by weight. These examples are set forth solely for the purpose of illustration and any specific enumeration of detail contained therein should not be interpreted as a limitation on the case except as indicated in the appended claims.

RESIN A

A fusible, soluble melamine resin is prepared by mixing 512 parts 37% formaldehyde solution, 386 parts of melamine at a temperature of 80° F. and adjusted with sodium hydroxide to a pH of approximately 7.0 (glass electrode). The slurry is heated to reflux, 30 to 40 minutes being required to raise the temperature to this point; the pH is then checked and adjusted to between 8.0 and 9.0. At this point, the material is slowly cooled to approximately 176° F. and held to that temperature while viscosity tests are made. When the reaction syrup reaches a viscosity at 25° C. of 45–50 seconds (Stormer) the syrup is adjusted in pH to approximately 9.5 and spray dried. The spray drying conditions are such as to produce a product which, in the form of a 50% solids aqueous solution, has a viscosity of 21–28 centipoises at 20° C., a pH at 25° C. of 8.5-9.5, and hydrophobidity at 15-25% dilution.

RESIN B

In order to convert Resin A from a fusible, soluble form to a fusible insoluble form in which its degree of polymerization is suitable for direct molding it was heat treated according to conditions described in U. S. Patent 2,563,630. Resin A, in ground form, is spread on trays and then is oven heated. It is heated at approximately 100° C. for 5 hours and then at 125° C. until a portion slurried with an equal weight of water gave a smooth nonsticky paste, 1-3 hours' heating at this higher temperature usually being sufficient. In comparison with Resin A, the product of the foregoing treatment when agitated with an equal weight or an excess of water dissolved to the extent of less than 15% of its weight.

A resin having substantially the same fusibility and insolubility characteristics is prepared by polymerization on heated differential rolls. With both fast and slow rolls operating at 120° C. and Resin A as the starting material, 33 minutes were sufficient to produce the desired insolubility while retaining fusibility.

Example 1

| | Parts by weight |
|---|---|
| Resin B | 88 |
| Plasticizer (polyamide) | 22 |
| Pigment (titanium dioxide) | 90 |
| Ethyl alcohol | 75 |
| Water | 225 |
| Mold lubricant | 1.1 |

The resin and pigment were ground and mixed in a ball mill. The other ingredients were added and blended for 16 hours to give a smooth dispersion having a consistency suitable for knife coating.

A surface laminate was prepared by coating a thermosetting resin impregnated 7-mil alpha, cellulose sheet, the paste being applied with a knife coater set at approximately 0.010 inch clearance, to the paper supported on a firm, level surface and dampened with water to make level contact therewith. The coating weight approximated 15 gs. of solids per square foot. The coated sheet was oven dried on a frame for 10 minutes at 90° C. The support sheet used in this case was one which had been saturated with a melamine-formaldehyde resin in the form of a syrup and dried. Such a sheet is one used in conventional melamine resin laminating practice and therefore the resin is in a fusible state.

Final products were made by superimposing the resin coated sheets on relatively inexpensive core stock and pressing in a laminating press at 250-800 p. s. i. and 150° C. for 30 minutes. Suitable core stock for this purpose are paper sheets such as kraft paper sheets which have been saturated with phenolic or other thermosetting resin which is still in a fusible condition. In the pressing or curing operation, the thermosetting resins in the various strata of the assembly are converted from the fusible to the infusible state. The phenolic resin core stock may be replaced by "Masonite" or resin impregnated compressed wood. These cured articles may be removed from the press while hot but preferably after cooling. A plurality of these products were prepared in which the plasticizer was nylon (an alcohol soluble linear polyamide) used alone or with a secondary plasticizer such as orthocresylglyceryl ether or where the plasticizer was polyvinyl butyral used alone or with a secondary plasticizer such as orthocresylglyceryl ether. These products had excellent appearance, color stability and durability and withstood heating for 16 hours at 105° C. and also withstood alternately exposing to steam for 15 minutes and heating at 105° C. for 15 minutes for 10 complete cycles without crazing. Notwithstanding these desirable attributes in the finished laminate, these products were, in each instance, severely attacked by alcohol. It is to be noted here that the resin and plasticizer were not blended on heated differential rolls until the resin was rendered substantially completely insolubilized.

Example 2

A surfacing resin is prepared by mixing 25 parts of an alcohol soluble polyamide "Nylon" FM-101 and 10 parts monoorthocryesylglyceryl-ether in a Banbury mixer at 155° C. The product in the form of a tough plastic mass is transferred to the differential hot rolls followed by 65 parts of a soluble fusible melamine-formaldehyde resin (Resin A) and one part of zinc stearate. The mix is then blended with both rolls operating at 150° C. for 8 minutes at which point the melamine resin is substantially completely insolubilized, thereafter the plasticized resin is removed from the rolls in the form of a sheet.

This resin sheet is subdivided to granular form and in this state 110 parts are ball milled with 90 parts of titanium dioxide pigment and 300 parts of a mixture of one part of ethyl alcohol to 3 of water. The resin and vehicle are blended for 16 hours, at the end of which period a smooth coating paste is obtained.

This paste is applied according to the procedure outlined in the above example to obtain surface laminated panels having excellent appearance, color depth, and gloss and superior resistance to abrasion, heat, steam, and particularly reagents such as alcohol, acid and alkali. It should be noted here that the resultant laminated panels produced have all of the desirable attributes with respect to appearance, color, depth, gloss, superior resistance to abrasion heat and steam and additionally displayed no attack whatever when exposed to alcohol. Furthermore, the laminate showed excellent resistance to acids and alkalis. In determining whether a panel had resistance to alcohol, the latter was maintained in contact with the surface continuously over 16 hours. If the surface has marred in any way, the panel was considered nonresistant.

Example 3

80 parts of melamine-formaldehyde resin (Resin A), 15 parts of crystalline polyamide "Nylon" FM-101 (Dupont), 5 parts of cresyl glyceryl ether, and one part of zinc stearate are charged to differential rolls heated at 135° C. (fast roll) and 65° C. (slow roll) and blended for 21 minutes, after which the polymerized plasticized resin was removed therefrom in the form of a sheet.

110 parts of the resin obtained by this process were ball milled with 90 parts of titanium dioxide pigment, 75 parts of ethanol and 225 parts of water. After blending this mixture for 16 hours, a coating paste was obtained which yielded cured surfaces having excellent resistance to reagents, particularly alcohol, and durability as revealed by exposure to dry heat and steam, substantially the same as in the case of the product of Example 2.

Example 4

72.5 parts of a melamine-formaldehyde resin (Resin A) 20 parts of polyvinyl butyral, 7.5 parts of cresyl glyceryl ether, and one part of zinc stearate were charged to differential rolls heated at 130° C. (fast roll) and 65° C. (slow roll) and blended for 21 minutes, and removed therefrom as a sheet. The sheet was micro pulverized and mixed in the proportion of 110 parts with 90 parts of titanium dioxide pigment. The pigmented resin was made into a paste according to the procedure and with the vehicle of Example 3. Panels having surface properties comparable to Example 2 were obtained.

Good results were obtained by the above technique with the crystalline polyamides and polyvinyl acetals, including polyvinyl formal, polyvinyl acetal and polyvinyl butyral. Superior results were obtained, however, with the polyamides and polyvinyl butyral; and, it was ascertained that a minimum of 15% of these materials should be used, and preferably 20% to 25% since optimum durability is obtained in this range without diminishing the other desirable properties. One could, of course, use larger quantities of the plasticizer such as up to 40% by weight based on the total weight of resin and plasticizer, particularly where the property of post-formability is desired in the cured laminate.

Plasticizers that have been found to give satisfactory results include the crystalline-linear polyamides of the alcohol or alcohol-water soluble types maximum water content about 25% having softening points below 165° C. at atmospheric pressure or below approximately 155° C. under slight pressure such as 50 lbs./sq. in. These are derived from interpolymerization of a diamine, a dicarboxylic acid and an aminocarboxylic acid or amide forming derivative. A typical polyamide, for example, may be prepared by reacting 6 parts hexamethylene diammonium adipate and 3.5 parts caprolactam or a corresponding amount of ε-aminocaproic acid under polyamide forming conditions. More than one diamine or dicarboxylic acid may be used but in each polyamide forming composition the diamine and dicarboxylic acid must be in substantially equimolecular proportions. Thus, 2 mols of ε-caprolactam, 0.5 mol hexamethylene diammonium adipate and 0.5 mol hexamethylene diammonium sebacate were heated together with a small amount of water to 170° C. and from 170° C., the temperature was raised to 235° C. in 4 hours where the polyamide was cold drawable to a strong film. Its softening point was 130° C., it dissolved readily in alcohol and its intrinsic viscosity was 0.71. By comparison, a polyamide made similarly from 2 mols ε-caprolactam and 1 mol hexamethylene diammonium sebacate had a softening point of 145° C. and an intrinsic viscosity of 0.81. Its alcohol solution made by warming, tended to gel on cooling. The following table presents some typical polyamides with their compositions in parts by weight and properties.

| Composition (parts by weight) | Softening Point, °C. | Intrinsic Viscosity | Solubility |
| --- | --- | --- | --- |
| 4.4 ε-caprolactam, 2.5 hexamethylene diammonium adipate. | 130 | 0.71 | soluble in alcohol. |
| 3.1 hexamethylene diammonium sebacate, 4.2 ε-caprolactam. | 145 | 0.81 | soluble in warm alcohol. |
| 5.8 hexamethylene diammonium sebacate, 4 ε-aminocaproic acid. | 165 | 1.29 | soluble in alcohol-water. |
| 6 hexamethylene diammonium adipate, 4.4 ε-caprolactam, 5.6 piperazine sebacate. | 105 | 0.46 | soluble in alcohol. |

The ethanol or ethanol-water soluble polyamides are the preferred types since they have been found to have the requisite compatibility with melamine-formaldehyde resin. Their melting or softening points are generally in a suitable range for blending with melamine resin and even though their softening points at atmospheric pressure may be as high as 165° C., under the shearing pressure of differential rolls their flow temperatures are lowered and this permits them to be successfully blended with melamine resin at such temperatures as 135–150° C. or even lower in some cases. In order to obtain the necessary toughness and flexibility in the polyamide it is generally necessary to carry their polymerization to a point where their intrinsic viscosity is about 0.25 or higher. In this region of polymerization they exhibit a crystalline X-ray pattern. Suitable starting materials for the preparation of the polyamides include such diamines as ethylene diamine, piperazine, tetramethylene diamine, pentamethylene diamine, hexamethylene-diamine, methyl hexamethylene diamine and p-phenylene diamine, dicarboxylic acids such as glutaric, adipic, pimelic, sebacic, suberic, azelaic, b-methyl, adipic and terephthalic acid and amino acids and their derivatives including ε-caprolactam, and α-aminovaleric acid. In the preferred polyamides, the amino acid or derivative constitutes approximately 50% by weight of the starting composition or more generally from 35 to 65% of same. Polyamides of the preferred type which are commercially available include those known as "Nylon" FM-101, 100 JM-6377 produced by E. I. Du Pont de Nemours. They have softening points between 150 and 165° C. and are alcohol or alcohol-water soluble. FM-100 is marked by an intrinsic viscosity of 1.31. Polyamides of the high melting type (softening point 195° C. or higher) such as that derived from hexamethylene diammonium adipate are of no direct utility in the practice of this invention.

Polyvinyl acetals including those more specifically designated as polyvinyl formal, polyvinyl acetal and polyvinyl butyrals, also act as effective plasticizers. All of the members of this group are derived from polyvinyl acetate by the complete or partial hydrolysis of acetate to hydroxyl groups followed by reaction with an aldehyde whereby the hydroxyl groups are converted to the acetal linkage. For satisfactory performance, certain compositional features are preferred. Free hydroxyl groups are desirable to aid compatibility with the melamine-formaldehyde resin. Generally, 5–25% of hydroxyl calculated as polyvinyl alcohol should be present with a minimum quantity of acetate such as 0–5% expressed as polyvinyl acetate with the balance of the composition in the form of polyvinyl formal, acetal or butyral. A suitable acetal composition is one having 10% acetate or polyvinyl acetate, 15% hydroxyl as polyvinyl alcohol and 75% polyvinyl acetal derived from acetaldehyde reaction. A much preferred composition is one containing 16–20% hydroxyl as polyvinyl alcohol, 3% acetate as polyvinyl acetate and the balance as the butyraldehyde acetal. The above-described polyvinyl acetals are further characterized in being substantially water insoluble. The polyvinyl acetal and butyral are moreover alcohol soluble whereas the formal is partially soluble in alcohol. It is frequently desirable to soften the plasticizers with 25 to 50% of a flow promoter such as monophenyl glycerine ether, mono-o-cresyl glycerine ether, monobenzyl glycerine ether, acrylamide, benzamide, N-β-hydroxy ethyl benzamide, p-toluene sulphonamide, N-β-hydroxy ethyl toluene sulphonamide, etc.

Any of the usual mold lubricants may be employed in the composition, or it may be left out and satisfactory products can be obtained. It has been found advantageous, however, to include a mold lubricant in compounding the material, and the preferred lubricant is zinc stearate.

A product possessing superior properties of resistance to mar, abrasion, reagents, heat, water and steam is obtained by employing a hot differential roll technique of polymerization wherein the resin is polymerized with a plasticizer, and frequently a secondary plasticizer, to produce the resin. This resin, together with pigment, are then ball mill ground and dispersed in water or water-alcohol vehicle to effect a coating paste as set forth in the examples above. There are two acceptable methods of roll polymerization. One process blends the plasticizer with a softening agent or secondary plasticizer, which blend is then rolled and sheeted with the melamine resin and preferably a rolling and molding lubricant, such as zinc stearate. The other process may be considered a one stage process, since all of the resin components in a dry-blended state are charged to heated differential rolls where they are mixed and polymerized by proper temperature adjustment. In both of these processes, the secondary plasticizer is employed to lower the softening point of the primary plasticizer to the range of normal rolling temperatures for the sake of compatibility. In cases wherein the primary plasticizer has a softening point within the range of the normal rolling temperatures, the secondary plasticizers may be omitted. Roll temperature and rolling time are controlled in these cases to effect a fairly stiff flow.

In preparing the water alcohol solution used as the dispersion medium, one can make use of the volatile water soluble monohydric alcohols and, more particularly, the lower aliphatic alcohols having between 1 and 4 carbon atoms such as methanol, ethanol, propanol, isopropanol, secondary butanol, isobutanol and tertiary butanol. The amount of alcohol present in the aqueous solution should be held within the range of about 10% to about 50% by weight based on the total weight of the aqueous alcohol solution and preferably between 20 and 40% by weight.

The amount of plasticized resin dispersed in the aqueous alcohol medium should be between about 20% and 40% by weight based on the total weight of the plasticized resin and the dispersion medium; preferably between 25 and 35% by weight of the plasticized resin based on the total weight of said resin and dispersion medium.

The pigmented resin coating dispersions appear to be more stable than unpigmented dispersions. Apparently, the pigment particles seem to aid in preventing resin from agglomerating. The pigmented resin coating dispersions, from which a water layer has separated, may be restored to its original condition by stirring or shaking, and in this sense are considered indefinitely stable.

Other pigments than those specifically mentioned in the example may be used including the mineral pigments such as zinc sulfide, lithopone, cobalt blue, chrome oxide, selenium pigments, lake colors or dyestuffs. The pH of the pastes or dispersions may be adjusted by the addition of acid or alkaline reagents or buffers in order to control paste stability, in dispersing pigments or to control the rate of cure on pressing. Colloidal dispersing agents or protective colloids or surface active agents may likewise be added to control or aid in the dispersion of the resin and pigment. Although laminates can be prepared without pigments, it is preferred to use them. Generally, not more than about 60% by weight of pigment should be used based on total weight of pigment and resin. Preferably, one would use 30-50% by weight of pigment.

Other plasticizers which may be used to produce these surfacing compositions, particularly the alcohol soluble linear polyamide or the polyvinyl acetal plasticizers may be found in copending application, Serial No. 684,782, filed July 19, 1946, now Patent No. 2,546,841, and Serial No. 684,781, filed July 19, 1946, now abandoned. Certain copolymers are also of value as plasticizers. These include copolymers derived from monomers such as acrylonitrile and ethylacrylate and N-substituted acrylamides as set forth in U. S. Patent No. 2,582,303, to Wohnsiedler and Kropa. Copolymers of acrylonitrile and vinyl acetate and copolymers of ethyl acrylate and 2,4-dimethyl styrene.

The melamine-formaldehyde resins used in the practice of the process of the present invention are of the non-alkylated variety, namely those which do not have, as an essential reactant, a compound containing an alcoholic hydroxy group such as methanol, butanol and the like. The essential reactants of the resin are melamine and formaldehyde and should be present in mol ratios varying between 1:1.5 and 1:6, but preferably 1:2 to 1:3, respectively.

In the drying step wherein the impregnated sheet, coated with the resinous paste, is dried prior to the application of heat and pressure to produce the laminate, one can accomplish this drying step by subjecting the coated sheet to temperatures between about 60° C. and 90° C. Quite obviously, one could use temperatures below 60° C. or above 90° C. but in the former instance, a much longer time would be required whereas in the latter instance, care would have to be exercised to avoid over-polymerization. The amount of time generally required to accomplish this drying step will vary between about 10 minutes at 90° C. and 2-3 hours at about 60° C.

In the actual heat and pressure step, wherein the laminate is converted into its final form, temperatures between about 135° C. and 165° C. may be utilized and pressures between about 250 p. s. i. and 2000 p. s. i. may be used. The preferred pressure range should be between about 750 and 1500 p. s. i. The amount of time required in this particular step will vary substantially with the temperature from about 10-15 minutes at the higher temperatures to about 1 or more hours at the lower temperature.

In the blending step, wherein the water soluble melamine resin is combined with the plasticizer on the heated differential rolls, it has been indicated hereinabove that it is desired that the blending operation be continued until the resin is substantially insolubilized. By this, it is intended that the resin shall be polymerized sufficiently so that it is soluble in water only to the extent of about 2%-15% and preferably closer to the lower limit. This is accomplished while still retaining the resin in a condition in which it exhibits fusibility and flow under the final molding conditions.

The plasticized surfacing compositions in the form of their aqueous-alcohol dispersions may be applied to other substrata of a character similar to the thermosetting resin impregnated sheet which serves as the carrier sheet for the preparation of laminates. For example, they may be sprayed on partially cured molded objects derived from phenolic, urea, melamine or other thermosetting resin molding compositions. Thereafter, the coating may be dried and the object given a final heat treatment in the original mold cavity to unite the surface plastic with the base plastic and to cure the assembly as a whole. Thereby, a decorative surface or one possessing unusual durability and resistance to staining may be applied.

A plurality of panels were prepared according to the process of Example 1 and of Example 2 with varying amounts of primary plasticizer and varying amounts of primary plasticizer plus secondary plasticizer and the panels were subjected to the alcohol test. The results are set forth hereinbelow:

ATTACK BY ALCOHOL

| Procedure of Example 1 | | Procedure of Example 2 | |
| --- | --- | --- | --- |
| Plasticizer, Percent of Surfacing Composition | Plasticizer Ball-Milled with Heat-Treated Melamine Resin | Plasticizer, Percent of Surfacing Composition | Plasticizer and Resin Reacted on Hot Rolls |
| 20—Nylon | severe. | 25—Nylon | } none. |
| 20—Nylon | Do. | 10—Cresyl glycerine ether. | |
| 20—Nylon | Do. | | |
| 15—Nylon | Do. | 15—Nylon | |
| 5—Cresyl glycerine ether. | Do. | 5—Cresyl glycerine ether. | } Do. |
| 20—polyvinyl butyral. | Do. | 20—P. V. butyral 7.5—Benzamide | } Do. |
| 10—P. V. butyral 5—Cresyl glycerine ether. | } Do. | | |
| 15—P. V. butyral 5—Cresyl glycerine ether. | } Do. | 15—P. V. butyral 5—Cresyl glycerine ether. | } Do. |

We claim:

1. A process for producing a surface laminate comprising coating a support sheet, impregnated with a thermosetting resin, with a composition comprising a paste-like suspension of a plasticized, insolubilized, fusible melamine-formaldehyde resin in an aqueous alcohol medium, heating said coated sheet to dryness and applying to said dried, coated sheet heat and pressure until said composition is rendered infusible, wherein the plasticized resin suspension is prepared by blending a soluble melamine-formaldehyde resin and a plasticizer on heated differential rolls until the melamine-formaldehyde resin is rendered insolubilized but fusible, thereafter milling said plasticized resin with an aqueous solution of a volatile, water-soluble monohydric alcohol having between 1 and 4 carbon atoms until a paste-like suspension is produced wherein said plasticizer is a member selected from the group consisting of (a) an alcohol or alcohol-water soluble linear polyamide having a softening point below about 165° C., (b) polyvinyl formal, polyvinyl acetal and polyvinyl butyral, wherein said acetals have a hydroxyl content, expressed as polyvinyl alcohol, between about 10% and 25% by weight based on the total weight of said acetal, wherein the proportions of resin to plasticizer are within the range of 85:15 to 60:40 parts by weight, respectively, wherein the weight ratio of the plasticized resin to the water-alcohol dispersion medium is within the range of about 40:60 to 20:80 parts by weight, respectively, and wherein the weight ratio of the water to alcohol is about 90:10 to about 50:50, respectively.

2. A process for producing a surface laminate comprising coating a support sheet, impregnated with a thermosetting resin, with a composition comprising a paste-like suspension of a plasticized, insolubilized, fusible melamine-formaldehyde resin in an aqueous alcohol medium, heating said coated sheet to dryness and applying to said dried, coated sheet heat and pressure until said composition is rendered infusible, wherein the plasticized resin suspension is prepared by blending a soluble melamine-formaldehyde resin and a plasticizer on heated differential rolls until the melamine-formaldehyde resin is rendered insolubilized, thereafter milling said plasticized resin with an aqueous solution of volatile water soluble monohydric alcohol having between 1 and 4 carbon atoms until a paste-like suspension is produced wherein said plasticizer is a member selected from the group consisting of (a) an alcohol soluble linear polyamide having a softening point below about 165° C., (b) polyvinyl formal, polyvinyl acetal and polyvinyl butyral, wherein said acetals have a hydroxyl content, expressed as polyvinyl alcohol between about 10% and 20% by weight, based on the total weight of polyvinyl acetal, wherein the proportions of resin to plasticizer are within the range of 80:20 to 70:30 parts by weight, respectively, wherein the weight ratio of the plasticized resin to the water-alcohol dispersion medium is within the range of about 35:65 to 25:75 parts by weight, respectively, and wherein the weight ratio of the water to alcohol is about 80:20 to 60:40, respectively.

3. The process according to claim 1 in which the plasticizer is an alcohol soluble linear polyamide having a softening point below about 165° C.

4. The process according to claim 1 in which the plasticizer is a polyvinyl butyral having a hydroxyl content expressed as polyvinyl alcohol between about 16% and 22% by weight.

5. A surface laminate produced according to the process of claim 1.

6. A surface laminate produced according to the process of claim 3.

No references cited.